United States Patent
Soquet

(10) Patent No.: US 8,542,822 B2
(45) Date of Patent: Sep. 24, 2013

(54) METHOD AND MODULE FOR RENEWING THE CODE OF A CRYPTOGRAPHIC ALGORITHM, METHOD AND MODULE FOR GENERATING A SEED, SECURITY PROCESSOR AND RECORDING CARRIER FOR THESE METHODS

(75) Inventor: Patrick Soquet, Paris (FR)

(73) Assignee: Viaccess, Paris la Defense (FR)

( * ) Notice: Subject to any disclaimer, the term of this patent is extended or adjusted under 35 U.S.C. 154(b) by 83 days.

(21) Appl. No.: 13/144,407

(22) PCT Filed: Dec. 29, 2009

(86) PCT No.: PCT/EP2009/067977
§ 371 (c)(1),
(2), (4) Date: Sep. 23, 2011

(87) PCT Pub. No.: WO2010/081631
PCT Pub. Date: Jul. 22, 2010

(65) Prior Publication Data
US 2012/0033804 A1     Feb. 9, 2012

(30) Foreign Application Priority Data

Jan. 13, 2009  (FR) .................... FR 0950148

(51) Int. Cl.
*G06F 21/00* (2006.01)
(52) U.S. Cl.
USPC ........................................................ 380/28
(58) Field of Classification Search
USPC .................... 380/28, 30; 713/161, 168, 176; 726/2
See application file for complete search history.

(56) References Cited

U.S. PATENT DOCUMENTS

| | | |
|---|---|---|
| 2002/0034300 A1 | 3/2002 | Thuvesholmen et al. |
| 2003/0149876 A1 | 8/2003 | McGough |
| 2004/0268117 A1 | 12/2004 | Olivier et al. |
| 2005/0129247 A1* | 6/2005 | Gammel et al. .............. 380/286 |
| 2006/0002550 A1 | 1/2006 | Campagna et al. |

FOREIGN PATENT DOCUMENTS

| | | |
|---|---|---|
| DE | 102005013830 | 9/2006 |
| EP | 1863285 | 12/2007 |
| WO | WO 2006/085283 | 8/2006 |
| WO | WO 2007/026287 | 3/2007 |
| WO | WO 2007/037869 | 4/2007 |

OTHER PUBLICATIONS

Ferguson et al. "Helix: Fast Encryption and Authentication in a Single Cryptographic Primitive" *Fast Software Encryption*, 2887: pp. 330-346 (2003).

Ronald H. Brown "Security Requirements for Cryptographic Modules" *Federal Information Processing Standards Publication*, pp. 1-53 (1994).

* cited by examiner

*Primary Examiner* — Brandon Hoffman
*Assistant Examiner* — Anthony Brown
(74) *Attorney, Agent, or Firm* — Occhiuti Rohlicek & Tsao LLP

(57) ABSTRACT

This method for renewing the code of an algorithm comprises:
receiving (122) a randomly drawn seed whose size in terms of number of bits, is at least four times smaller than the number of bits needed to encode the N numerical constants of the cryptographic algorithm,
expanding (128) the seed deterministically to obtain a sequence of numbers whose size, in number of bits, is at least equal to the number of bits needed to encode the N numerical constants of the cryptographic algorithm,
generating (132) N new numerical constants from the sequence of numbers obtained, and
replacing (134) the N constants of the code of the cryptographic algorithm by the N new constants generated to obtain the code of a renewed cryptographic algorithm.

16 Claims, 4 Drawing Sheets

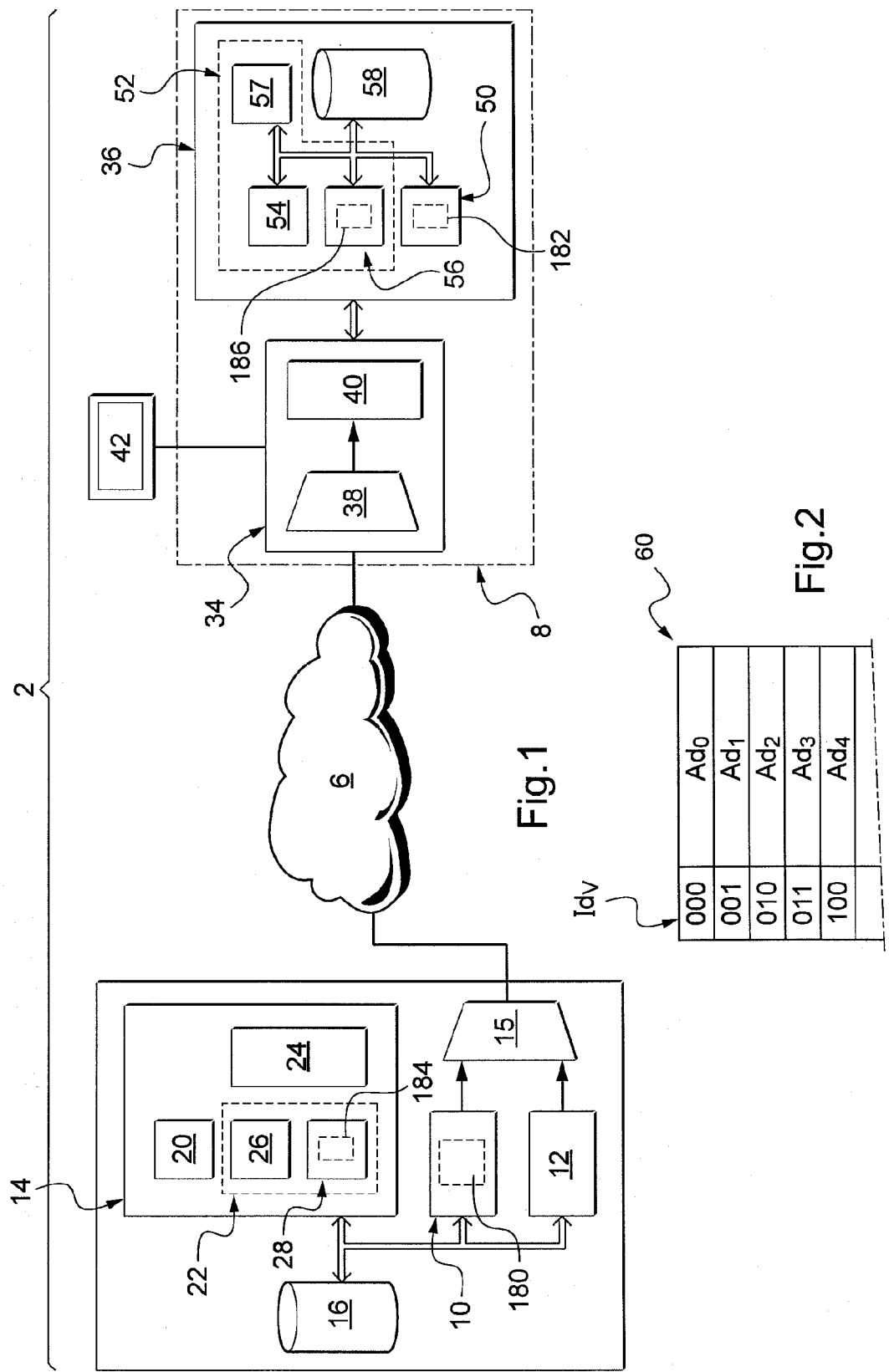

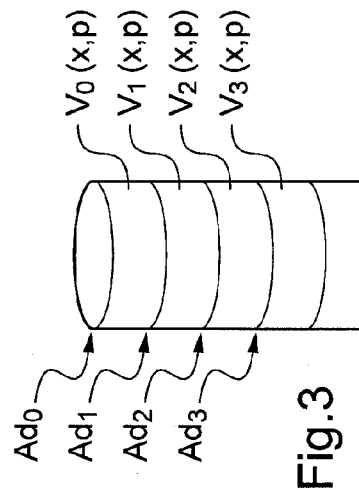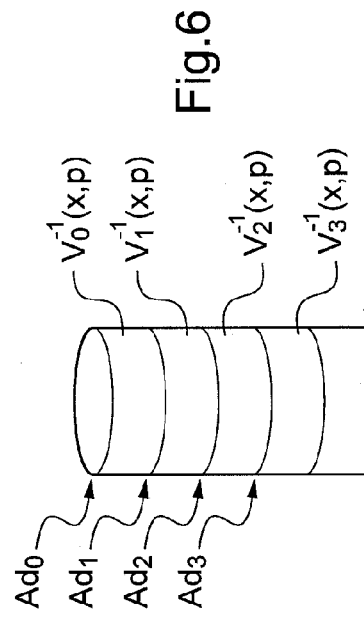
Fig.3
Fig.4
Fig.5
Fig.6

METHOD AND MODULE FOR RENEWING THE CODE OF A CRYPTOGRAPHIC ALGORITHM, METHOD AND MODULE FOR GENERATING A SEED, SECURITY PROCESSOR AND RECORDING CARRIER FOR THESE METHODS

CROSS REFERENCE TO RELATED APPLICATIONS

This application is the national stage entry under 37 USC 371 for: PCT/EP2009/067977, filed Dec. 29, 2009, which claims the benefit of the Jan. 13, 2009 priority date of French application 0950148. The contents of both the foregoing applications are incorporated herein by reference.

The invention relates to a method and a module for renewing the code, executable or interpretable by an electronic computer, of a cryptographic algorithm. The invention also relates to a security processor and to an information recording medium for implementing these methods.

A cryptographic algorithm is used to encipher a piece of data D by means of a key K to obtain a cryptogram D* or decipher a cryptogram D* by means of a key K to obtain a piece of unencrypted data D. When it is implemented on an electronic computer, this cryptographic algorithm corresponds to an executable or interpretable code. The code is said to be executable when it has been compiled preliminarily so that it can be directly executed by the computer. The code is said to be executable when it is compiled preliminarily so that it can be directly executed by the computer. The code is said to be <<interpreted>> when it is translated into instructions as and when it is executed. This translation into executable instructions is done by a machine as a "virtual machine", for example in the JAVA® language by SUN microsystems Whether the code is executable or interpretable, at the lowest level, this code is constituted by a succession of bits. In this succession of bits it is possible to discern at least N numerical constants independent of the piece of data D, the key K and the cryptogram D*. Each numerical constant corresponds to an operand or to a mnemonic of an instruction of the executable or interpretable code. An operand is typically a parameter of an instruction whose value is constant. At the lowest level, an instruction is written in binary form and therefore also takes the form of a numerical constant in the executable or interpretable code. This instruction corresponds to a low-level mnemonic.

For example, the methods for renewing the code of a cryptographic algorithm are used when it is sought to boost the security level of a system by making the cryptographic algorithm secret. This algorithm may be a proprietary algorithm or one derived from a known family of algorithms such as DES (Data Encryption Standard) or AES (Advanced Encryption Standard). In this example, the security of the system depends on the secrecy of the key, the algorithm and its execution parameters.

For a clearer understanding of the applications of the cryptographic algorithms and the associated terminology, reference could be made to Bruce Shneier, "Applied Cryptography" (second edition), John Wiley and Sons, 1996.

Many precautions are taken to keep the cryptographic algorithm secret. For example, this cryptographic algorithm is recorded and executed solely in a security processor designed to make any attempt at cryptanalysis difficult. This security processor carries out cryptographic operations on behalf of other apparatuses which are less secured than it.

However, despite these precautions, it can happen that the cryptographic algorithm is discovered and made public. This is a serious breach in secured systems using this cryptographic algorithm because the secrecy of enciphered data relies solely on the preservation of the secrecy that surrounds the key.

In such a situation, it is desirable to renew the cryptographic algorithm by replacing it by a new secret cryptographic algorithm. This new secret cryptographic algorithm is called a "renewed algorithm" while the former algorithm which it replaces is called the "former algorithm". The encipherment and decipherment operations performed by means of the renewed cryptographic algorithm are not compatible with those performed by means of the former algorithm. Thus, the former algorithm cannot be used to decipher cryptograms that are decipherable by means of the renewed algorithm. Nor can the former algorithm be used to obtain the same cryptogram as the one obtained with the renewed algorithm when they are both applied to the same piece of unencrypted data.

The methods for renewing the code of the cryptographic algorithm are used to obtain the renewed cryptographic algorithm code.

Several methods of renewal are known. For example, in a first method, the code of a renewed cryptographic algorithm is sent through an information transmission network to a security processor. Such a procedure calls for substantial bandwidth on the network. Furthermore, the monitoring and cryptanalysis of the code transmitted on the network may make it possible to discover the renewed cryptographic algorithm and therefore compromise the security of the system.

A second method consists of the recording, initially in a same security processor, of several codes known as "variants" of renewed cryptographic algorithms. Then, when necessary, the code of the cryptographic algorithm currently used is deactivated and in its place, the execution of the code of one of the pre-recorded variants is activated. The activation of a variant of the cryptographic algorithm is triggered in response to the reception of an activation message. The second type of method does not require substantial bandwidth to transmit the activation message since this activation message does not contain the renewed cryptographic algorithm code. Furthermore, the monitoring and cryptanalysis of the activation message received by the security processor are not sufficient in themselves to discover the renewed cryptographic algorithm.

However, this second method requires more memory resources since it is necessary to initially record the different variants of the cryptographic algorithm in the security processor. If the entire code implemented in the security processor becomes known, then each variant of a cryptographic algorithm becomes known too.

The invention seeks to overcome at least one of these drawbacks by proposing an improved method for renewing the code of a cryptographic algorithm.

An object of the invention therefore is a method of renewal comprising steps for:
  receiving a randomly drawn seed whose size in terms of number of bits, is at least four times smaller than the number of bits needed to encode the N numerical constants of the cryptographic algorithm,
  expanding the seed deterministically to obtain a sequence of numbers whose size, in number of bits, is at least equal to the number of bits needed to encode the N numerical constants of the cryptographic algorithm,
  generating N new numerical constants from the sequence of numbers obtained, and
  replacing the N constants of the code of the cryptographic algorithm by the N new constants generated to obtain the code of a renewed cryptographic algorithm.

A deterministic expansion is an operation for generating a sequence of numbers from a seed in such a way that, whenever the same seed is used to initialize the expansion, the sequence of numbers obtained is the same.

In the above method, the size of the seed is far smaller than that of the code of the renewed cryptographic algorithm. Indeed, the size of the renewed algorithm is at least greater than the size of the N constants. Thus, this method is less "needy" in terms of bandwidth than the methods in which the full code of the algorithm is transmitted through an information transmission network. Furthermore, since the seed is drawn randomly, the analysis of the received seed is not sufficient by itself to retrieve the renewed cryptographic algorithm. Indeed, to this end, it is also necessary to know the algorithm used in order to carry out the expansion of the seed. Now this algorithm is not transmitted by means of the information transmission network.

Nor does this method call for the initial storage of a multitude of variants of cryptographic algorithms. Thus, this method exploits fewer memory resources on the part of the processor which executes the cryptographic algorithm.

Unlike methods for activating a pre-recorded variant of the cryptographic algorithm, the discovery of the code executed by the security processor is not sufficient on its own to determine the renewed cryptographic algorithm code. For this, it is also necessary to know the received seed.

Finally the generation and the replacement of N constants are done far less frequently than the execution of the cryptographic algorithm. Thus, the discovery of the algorithm used for the expansion of the seed and for generation of the N new numerical constants is made more difficult. For example, it is more difficult to make attempts at cryptanalysis based on the analysis of energy consumption curves, electro-magnetic radiation curves, or other techniques based on signals generated by the security processor when it is in operation.

The embodiments of this method of renewal can comprise one or more of the following characteristics:

Each numerical constant corresponds either to an operand or to a mathematical operator which, when it is replaced by a new mathematical operator, does not modify the order of execution of the instructions of the code of the cryptographic algorithm;

If the presence of a secret code within a first part of a received message is detected, then the pieces of data contained in a second predetermined part of this message or a subsequently received message are used to build the seed, and if the presence of the secret code within the first part of the message is not detected, then the pieces of data contained in the first and second parts are used for ends other than the renewal of the cryptographic algorithm;

If the presence of the secret code is not detected, then the pieces of data contained in the first and second parts are used to verify the integrity of the data contained in the message or messages;

The message or messages are ECM (Entitlement Control Messages) or EMM (Entitlement Management Messages);

The replacement of the N constants of the cryptographic algorithm by the N new constants generated is triggered in response to a triggering event independent of the reception of the seed;

The size of the seed in numbers of bits is at least ten times smaller than the number of bits needed to encode the N numerical constants;

The deterministic expansion is achieved by means of a pseudo-random generator initialized with the received seed.

N is strictly greater than two and preferably greater than ten.

These embodiments of the method of renewal furthermore have the following advantages:

replacing the operands and/or mathematical operators of the code makes it possible not to modify the order of execution of the instructions of the code of the cryptographic algorithm, thus simplifying the implementation of this method of renewal;

using a secret code to indicate the fact that a second part of a message, normally used for other purposes, contains the seed enables the transmission of the seed to be concealed;

concealing the secret code and the seed in a cryptographic redundancy of a message makes it possible to transmit valid data in all the other fields of the message and hence not to modify the behavior of the receiver even when the cryptographic redundancy contains the seed or the secret code;

triggering the replacement of the N constants in response to a triggering event independent of the reception of the seed makes it more difficult to identify the message received that contains the seed;

using a seed whose size is at least ten times smaller than the number of bits needed to encode the N numerical constants makes for even further savings in bandwidth on the network.

An object of the invention is also a module for renewing the code of the cryptographic algorithm, comprising:

a sub-module for receiving a randomly drawn seed whose size in terms of number of bits, is at least four times smaller than the number of bits needed to encode the N numerical constants of the cryptographic algorithm, a deterministic generator of numbers initializable with the seed to obtain a sequence of numbers whose size, in number of bits, is at least equal to the number of bits needed to encode the N numerical constants of the cryptographic algorithm a builder of cryptographic algorithmic codes capable of:
  generating N new numerical constants from the sequence of numbers obtained, and
  replacing the N constants of the code of the cryptographic algorithm by the N new constants generated to obtain the code of a renewed cryptographic algorithm.

An object of the invention is also a security processor capable of executing or interpreting the code of the cryptographic algorithm. This security processor includes the above renewing module.

An object of the invention is also a method for generating a seed intended for use by the above method of renewal. This method comprises steps for:

a) randomly drawing a seed whose size, in terms of number of bits, is at least four times smaller than the number of bits needed to encode the N numerical constants of the cryptographic algorithm, b) creating an encipherment algorithm code corresponding to the renewed cryptographic algorithm code obtained by means of the method of renewal when the received seed is the one drawn during the step a), c) checking the robustness of the code of the encipherment algorithm relative to at least one method of cryptanalysis, d) if the code of the encipherment algorithm is not robust relative to the method of cryptanalysis, then returning to the step a) and, if not, e) transmitting the randomly drawn seed to a receiver capable of implementing the method of renewal of the code of the cryptographic algorithm.

Checking the robustness of the encipherment algorithm corresponding to the renewed cryptographic algorithm makes it possible to use only seeds by which it is possible to obtain robust cryptographic algorithms.

An object of the invention is also a seed generating module comprising:
- a generator capable of randomly drawing a seed whose size, in terms of number of bits, is at least four times smaller than the number of bits needed to encode the N numerical constants of the cryptographic algorithm,
- a sub-module for creating an encipherment algorithm code corresponding to the renewed cryptographic algorithm code obtained by means of the method of renewal when the received seed is the one drawn by the generator;
- a checker of the robustness of the code of the encipherment algorithm relative to at least one method of cryptanalysis, this checker being capable of:
  - inhibiting the transmission of the randomly drawn seed to a receiver if the encipherment algorithm is not robust with respect to the method of cryptanalysis and, if not,
  - permitting the transmission of the randomly drawn seed to a receiver capable of implementing the method of renewal of the code of the cryptographic algorithm.

Finally, an object of the invention is also an information recording medium containing instructions for implementing the above methods, when they are executed by an electronic computer.

The invention will be understood more clearly from the following description, given purely by way of a non-exhaustive example and made with reference to the appended drawings, of which:

FIG. 1 is a schematic illustration of a system for transmitting a scrambled multimedia content between a sender and a receiver, FIG. 2 is a schematic illustration of a conversion table used in the sender and the receiver of the system of FIG. 1, FIG. 3 is a schematic illustration of the content of a memory of the sender of the system of FIG. 1, FIGS. 4 and 5 are schematic illustrations of tables of indirection used respectively by the transmitter and the receiver of the system of FIG. 1;

FIG. 6 is a schematic illustration of the content of a memory used by the receiver of the system of FIG. 1;

In these figures, the same references are used to designate the same elements.

Figure 7:
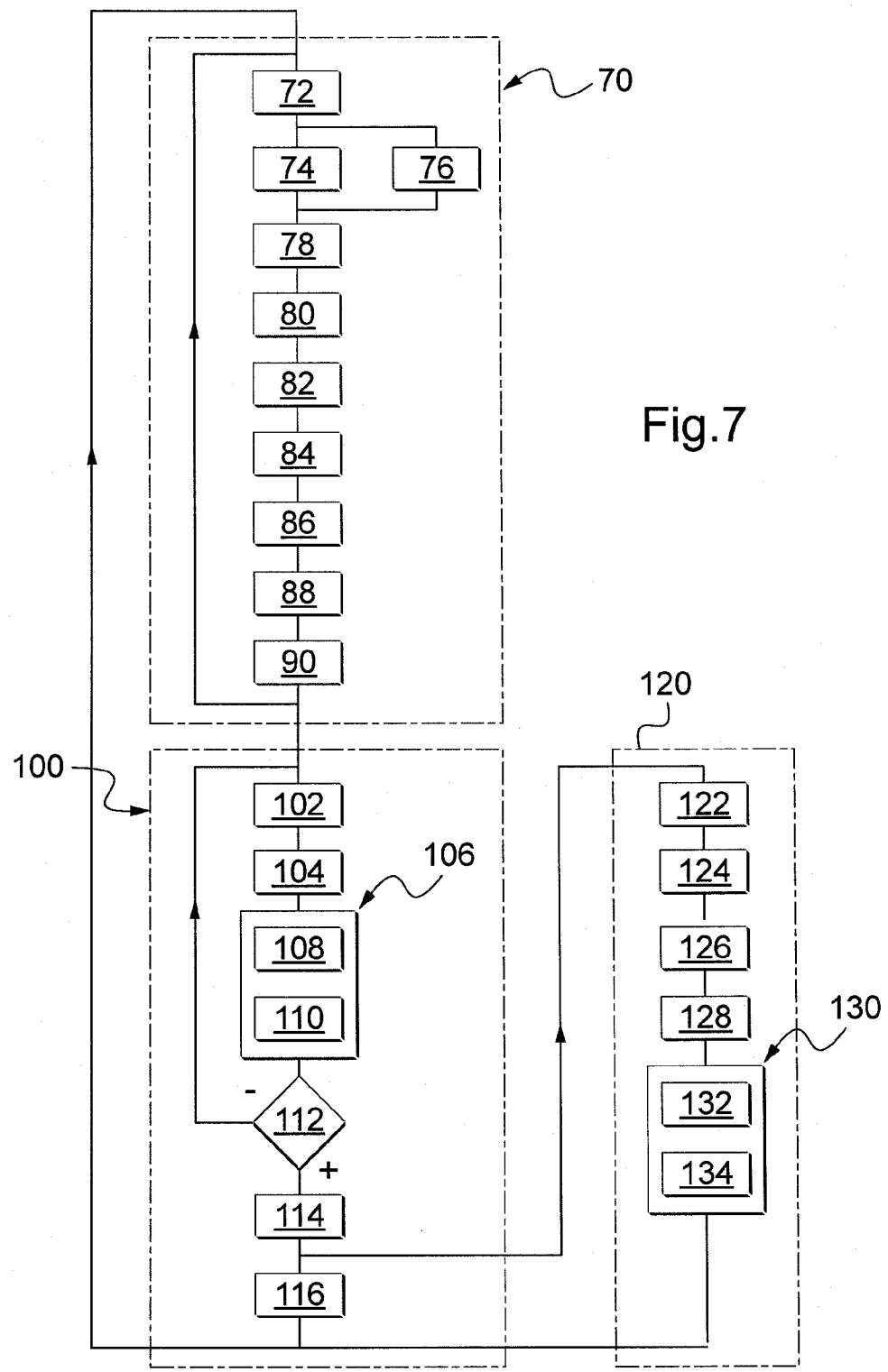
FIG. 7 is a flowchart of a method for transmitting scrambled multimedia content in which there are implemented phases for renewing the code of the cryptographic algorithm and for generating a seed to renew this code.

Here below in this description, the characteristics and functions well known to those skilled in the art shall not be described in detail. Furthermore, the terminology used is that of access systems conditional on scrambled multimedia contents. For more information on this terminology, the reader may refer to the following document:

"*Functional Model of Conditional Access System*>>, *EBU Review-Technical European Broadcasting Union*, Brussels, BE, No. 266, 21 Dec. 1995."

FIG. 1 represents a system 2 for transmitting multimedia content between the sender 4, and a multitude of receivers. The receivers are connected to the sender 4 by means of an information transmission network 6. For example, the network 6 is a satellite network to which the receivers are connected by means of wireless links.

To simplify the illustration, only a receiver 8 has been represented in FIG. 1. It is assumed here that the other receivers are identical to the receiver 8.

The sender 4 comprises:
- a cryptographic module 10 capable of executing a cryptographic algorithm such as an encipherment algorithm F for enciphering a control word CW,
- An ECM (Entitlement Control Message)/EMM (Entitlement Management Message) message generator 12,
- A module 14 for generating a seed for renewing an algorithm $F^{-1}$ for deciphering a cryptogram CW* of the control world CW.

The module 10 is also capable of executing an algorithm for enciphering the multimedia content by means of the control word CW to obtain a scrambled multimedia content.

Outputs of the modules 10 and 12 are connected to a multiplexer 15. This multiplexer 14 multiplexes the scrambled multimedia content by the module 10 to the ECM and EMM messages generated by the generator 12 to obtain the multiplexed multimedia content. The multiplexed multimedia content is broadcast to the receivers by means of the network 6.

The modules 10 and 14 and the generator 12 are connected to a memory 16 by means of an information transmission bus.

The module 14 comprises:
- a generator 20 capable of randomly drawing a seed,
- a sub-module 22 for creating the executable code of an encipherment algorithm F' corresponding to a renewed deciphering algorithm $F^{-1}$, and,
- a checker 24 of robustness of the algorithm F' created by the sub-module 22.

An enciphering algorithm corresponds to a deciphering algorithm if the cryptogram D* which it creates is decipherable by means of the deciphering algorithm. In the case of a symmetrical cryptography, this means that the enciphering algorithm is the inverse of the deciphering algorithm.

The sub-module 22 comprises:
- a deterministic generator 26 for generating a sequence of numbers which can be initialized with the seed drawn by the generator 20, and
- a builder 28 of the enciphering algorithm F' corresponding to the renewed deciphering algorithm $F_{-1}$.

For example, the generator 26 is a pseudo-random generator known as a PRNG (Pseudo-Random Number Generator). Thus, in this case, a "randomly" drawn number also designates a pseudo-randomly drawn number.

The module 14 is made out of a programmable electronic computer capable of executing instructions recorded on an information recording medium. To this end, the memory 16 comprises the instructions and data needed to execute the method of FIG. 7.

The receiver 8 has a decoder 34 of the multiplexed multimedia content connected to a security processor 36.

The decoder 34 comprises a demultiplexer 38 capable of demultiplexing the multiplexed multimedia content and a de-scrambler 40 capable of de-scrambling the multimedia content by means of the control word CW which itself is given by the processor 36.

The decoder 34 is connected to a screen 42 such as a television screen capable of the unencrypted display of the multimedia content. The expression "unencrypted" means that the multimedia content displayed on the screen 42 is directly comprehensible to a human being.

In this particular case, the processor 36 is detachable. It may therefore be connected to and disconnected from the decoder 34 reversibly. For example, the process 36 is a chip card.

The processor 36 comprises:
a cryptographic module 50 capable of executing the algorithm $F^{-1}$ for deciphering the cryptogram CW*, and
a module 52 for renewing the deciphering algorithm executed by the module 50.

The module 52 has a deterministic generator 54 identical to the generator 26 and a builder 56 of the renewed deciphering algorithm and a sub-module 57 for receiving a seed.

The module 50, the generator 54 and the builder 56 are connected to a memory 58.

The processor 36 is made out of a programmable electronic computer capable of executing instructions recorded on an information recording medium. To this end, the memory 58 has the necessary instructions and the data needed for the execution of the method of FIG. 7.

The sender 4 uses an enciphering algorithm F to obtain the cryptogram CW* of the control word transmitted to the receiver 8 in an ECM message. The processor 38 uses an algorithm $F^{-1}$ to decipher the cryptogram CW* in order to obtain the unencrypted control word CW which is then used by the de-scrambler 40. Here, the enciphering and deciphering algorithms are secret algorithms.

An example of secret enciphering and deciphering algorithms shall now be presented before a more detailed description is provided of the workings of system 2.

Here, a symmetrical cryptography is used to perform these encipherment and decipherment algorithms F and $F^{-1}$. For example, the algorithms are built by modifying the AES-128 (Advanced Encryption Standard-128) cryptographic algorithm. In the AES-128 algorithm, the piece of input data D is encoded on 128 bits and the key is also encoded on 128 bits. This algorithm AES is well known so that the details pertaining to this algorithm are omitted from this description. It shall simply be recalled that the AES-128 enciphering algorithm comprises 10 rounds $T_i$ where the index designates the number of the rounds. These rounds $T_i$ consist especially of the following operations:
a substitution operation during which each byte is replaced by another from a pre-recorded substitution table,
a rightward rotation with a certain number of steps,
a linear transformation during which the bytes are combined with a polynomial predefined by an XOR operation, and
a step for combining bytes of the piece of data to be enciphered and the key by means of an XOR ("Exclusive-Or") operation.

The operation of the first round and of the second round may differ slightly from the procedure described here above.

The intermediate cryptogram obtained at the end of the ith round $T_i$ is denoted as $D^*_i$ and the final cryptogram obtained after the full execution of the encipherment algorithm is denoted as D*.

Here, the AES-128 encipherment algorithm is modified by the fact that, after each round $T_i$, a function $F_i$ is applied to the intermediate cryptogram $D^*_i$. Then, the next round $T_{i+1}$ takes the piece of data $F_i(D^*_i)$ as its input instead of the piece of data $D^*_i$. Thus, $D^*_{i+1}=T_{i+1}oF_i(D^*_i)$. In other words, after modification, the secret encipherment algorithm F used here can be written as follows:

$$D^*=F(D)=F_{10}oT_{10}o\ldots oF_2oT_2oF_1oT_1(D)$$

where:
D is the piece of data in unencrypted form,
$T_i$ corresponds to the composition of the operations executed during the ith round of the AES-128 encipherment algorithm,
$F_i$ is the secret function applied to the intermediate cryptogram $D^*_i$ obtained at the round $T_i$, and
o is the "functions composition" operation.

The dots and dashes presented in the above relationship mean that the full formula has not been represented so as to simplify its writing.

With the same notations, the secret deciphering algorithm $F^{-1}$ can be written as follows:

$$D=F^{-1}(D^*)=T_1^{-1}oF_1^{-1}oT_2^{-1}o\ldots oT_{10}^{-1}oF_{10}^{-1}(D^*)$$

where "$^{-1}$" indicates that this is the inverse of the corresponding function.

Each function $F_i$ is formed by the composition of eight reversible elementary functions $f_{i1}$ à $f_{i8}$. Thus, the function $F_i(D^*_i)$ is written as follows:

$$F_i(D^*_i)=f_{i8}of_{i7}of_{i6}of_{i5}of_{i4}of_{i3}of_{i2}of_{i1}(D^*_i).$$

Each function $f_{ij}$ is chosen from the group formed by the following eight functions $V_k$:

$$V_0(x,p)=x\text{XOR}p$$

$$V_1(x,p)=x+p$$

$$V_2(x,p)=x-p$$

$$V_3(x,p)=x\times(2\times p+1)$$

$$V_4(x,p)=\text{rot\_left}(x,p\bmod 8)$$

$$V_5(x,p)=\text{rot\_right}(x,p\bmod 8)$$

$$V_6(x,p)=\text{NOT}(x\text{XOR}p)$$

$$V_7(x,p)=x.$$

x and p are variable parameters of each function $V_k$. x and p are also both operands of the functions $V_k$.

The function <<mod 8>> is the congruence function modulo 8. The function rot_left is the function that shifts the bits of the piece of data x by a step equal to the result of the operation p mod 8. The function rot_right is identical to the function rot_left except that the shift is done rightwards.

The functions XOR and NOT are well known Boolean functions.

In the definition of a function $F_i$, several functions $f_{ij}$ may be identical.

The executable code of the function $V_k$ is recorded and executable by calling the instructions recorded from the address $\text{Ad}_k$ in the memory 16. The section of the memory 16 in which the executable codes of the functions $V_k(x,p)$ are recorded are illustrated in detail with reference to FIG. 3.

The executable code of these functions $V_k(x,p)$ is pre-recorded before any use of the sender 4.

Here below, $p_{ij}$ denotes the value of the parameter p of the function $f_{ij}$. With this notation, the function $f_{ij}$ can be written as follows:

$$f_{ij}(x)=V_k(x,p_{ij})$$

where the indices k and j are contained between 1 and 8.

This means that a function $f_{ij}$ is entirely defined as soon as the address $\text{Ad}_k$, at which the executable code of the function $V_k$ and the value of the parameter $p_{ij}$ are located, are known.

The address $\text{Ad}_k$ and the value of the parameter $p_{ij}$ for each function $f_{ij}$ are numerical constants in the code of the algorithm F. These numerical constants are independent of the piece of data D to be enciphered and the encipherment key K.

Here, the code of the algorithm F therefore comprises eighty numerical constants to define all the functions $f_{ij}$ and other numerical constants defining each of the rounds T.

The address $Ad_k$ is encoded on several bytes, for example, two bytes. The value of each parameter $p_{ij}$ for its part is encoded on one byte. This means that the definition of a function $f_{ij}$ can be encoded on three bytes. However, to limit the number of bits needed to encode the definition of a function $f_{ij}$, here a conversion table 60 (see FIG. 2) is used. This table contains a first column containing the eight possible values of an identifier IdV of the address $Ad_k$ of the function $V_k$. For example, in FIG. 2, the values 0, 1, 2, 3 and 4 of the identifier IdV written in binary mode correspond respectively to the addresses $Ad_0$, $Ad_1$, $Ad_2$, $Ad_3$ and $Ad_4$ on the basis of which the executable codes, respectively of the functions $V_0$, $V_1$, $V_2$, $V_3$, and $V_4$, can be called.

The table 60 is pre-recorded in the memory 16.

Through the use of the table 60, the definition of a function $f_{ij}$ can be encoded on 11 bits only, three bits to encode the value of the identifier IdV and eight bits to encoder the value of the parameter $p_{ij}$.

Thus, to encode the definition of a function $F_i$, a minimum of 88 bits is required since each function $F_i$ is the result of the composition of eight functions $f_{ij}$. Finally, to define the set of functions $F_i$ used in the encipherment algorithm F, a minimum of 880 bits is therefore needed.

The definition of each of the functions $f_{ij}$ used in the encipherment algorithm F is recorded in an indirection table 62. An example of a table 62 is shown in FIG. 4. This table 62 comprises for each function $f_{ij}$:
- an identifier, herein denoted $f_{ij}$, of the function $f_{ij}$,
- the address $Ad_k$ of the place in which the executable code of the function $V_k$ used in the definition of the function $f_{ij}$ is located, and
- the value of the parameter $p_{ij}$.

For example, in FIG. 4, the function $f_{11}$ is defined by the address $Ad_3$ and by the operand $p_{11}$. This means that the function $f_{11}$ is written as follows:

$$f_{11}(x) = V_3(x, p_{11}).$$

To simplify FIG. 4, the definitions of the functions $f_{ij}$ which have been omitted have been replaced by dots and dashes.

The functions $f_{ij}$ are all reversible. Thus, the functions $F_i^{-1}(D'^*_i)$ used in the deciphering algorithm $F^{-1}$ can be written as follows:

$$F_1^{-1}(D'^*_i) = f_{i1}^{-1} \circ f_{i2}^{-1} \circ \ldots \circ f_{i8}^{-1}(D'^*_i)$$

Similarly to what was described for the enciphering algorithm, each function $f_{ij}^{-1}$ is defined in an indirection table 64 recorded in the memory 58 of the processor 36. An example of this table 64 is shown in FIG. 5. As in the case of the table 62, this table associates the following for each function $f_{ij}^{-1}$:
an identifier $f_{ij}^{-1}$ of this function, the address $Ad_k$ in which the executable code of the inverse of the function $V_k$ is located and the value of the operand $p_{ij}$.

FIG. 6 gives a more detailed view of a portion of the memory 58 in which the functions $V_k^{-1}(x,p)$ are recorded. To simplify the description, it is assumed here that the executable code of the function $V_k^{-1}(x,p)$ is recorded at the same address $Ad_k$ in the memory 58 as the one at which the executable code of the function $V_k(x,p)$ is recorded in the memory 16. With this assumption, the memory 58 contains a conversion table identical to the table 60.

The working of the system 2 shall now be described with reference to the method of FIG. 7. Initially, a phase 70 for broadcasting the multimedia content is executed. At the beginning, at a step 72, the sender 4 generates a control word CW.

Then, at a step 74, this code word CW is used to scramble or encipher the multimedia content. At the same time, at a step 76, the code word CW is enciphered by the module 10 in using the algorithm F to obtain the cryptogram CW*. Once the cryptogram CW* has been obtained, again during the step 76, the generator 12 generates a message ECM containing this cryptogram.

Then, at a step 78, the scrambled multimedia content and the message ECM as well as possible EMM messages are multiplexed by the multiplexer 15.

At a step 80, the multiplexed multimedia content thus obtained is broadcast to all the receivers by means of the network 6.

Then, at a step 82, the receiver 8 receives the multiplexed multimedia content.

At a step 84, the demultiplexer 38 demultiplexes this multiplexed multimedia content and transmits the scrambled multimedia content to the scrambler 40 and the ECM message to the security processor 36.

At a step 86, the processor 36 deciphers the cryptogram CW* by executing the algorithm $F^{-1}$ and sends the scrambler 40 the control word CW thus obtained in unencrypted form.

At a step 88, the de-scrambler 40 de-scrambles the scrambled multimedia content received by means of the control word CW transmitted by the processor 6 and transmits the de-scrambled multimedia content to the screen 42.

At a step 90, the de-scrambled multimedia content is displayed in unencrypted form on the screen 42.

The control word CW is modified at regular intervals. The interval during which the code word CW is not modified is called a "crypto-period". Thus, the steps 72 to 90 are reiterated for each crypto-period. For example, a crypto-period lasts less than 20 seconds and preferably less than 11 seconds.

When necessary, a phase 100 is carried out for generating a seed that can be used to renew the algorithms F and $F^{-1}$.

At the beginning of the phase 100, during a step 102, the generator 20 generates a new seed. This size in number of bits, of this seed is at least four times and preferably ten or 20 times smaller than the 880 bits needed to encode the numerical constants defining the functions $f_{ij}$.

Here, the size of the seed is 16 bits. These 16 bits are drawn randomly. For example, the random draw is initialized from a physical phenomenon which occurs on one of the user interfaces of the sender 4. For example, the random draw is initialized by the movement of a mouse.

Then, at a step 104, a deterministic expansion of the seed is performed to obtain a sequence of numbers. The size of this sequence of numbers in number of bits is at least equal to the number of bits needed to encode the numerical constants defining the functions $f_{ij}$. Here, the deterministic expansion consists in generating an 880-bit sequence from a seed encoded on 16 bits. To carry out this expansion, this pseudo-random generator 26 is initialized with the seed obtained at the step 102.

Then, at a step 106, the code of an encipherment algorithm F' corresponding to a renewed deciphering algorithm $F'^{-1}$ of the cryptogram CW* is created. To this end, a new indirection table Tab' is created wherein the numerical constants are different from those contained in the table 62.

More specifically, at an operation 108, the new numerical constants to be recorded in the indirection table Tab' are generated.

Figure 8:
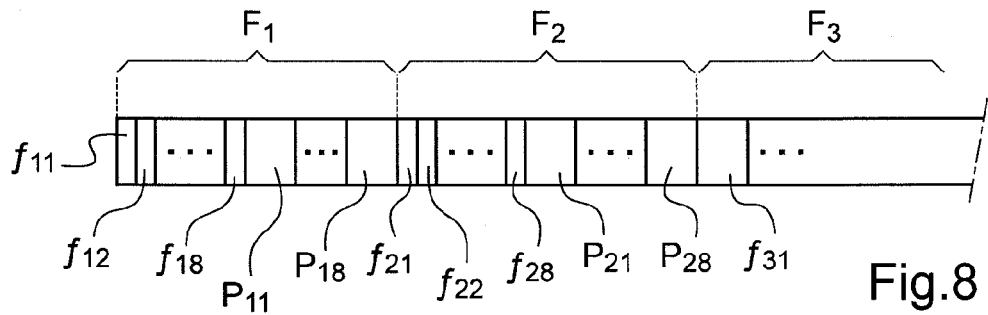
FIG. 8 is a schematic illustration of a sequence of numbers obtained from a deterministic generator.

To explain the generation of these numerical constants, FIG. 8 shows the start of the sequence of numbers obtained after the step 104. This sequence of numbers here is a sequence of numbers written in binary mode. It is therefore a succession of zeros and ones. This sequence of numbers is divided into ten successive 88-bit segments respectively corresponding to the functions $F_1, F_2, \ldots, F_{10}$. These segments are structured in the same way. This structure is described with reference to the segment $F_1$. The first 24 bits of the segment $F_1$ are divided into eight sub-segments denoted $f_{11}$, $f_{12}, \ldots, f_{18}$. The rest of the segment $F_1$ is divided into eight successive segments denoted as $p_{11}$ to $p_{18}$.

Each sub-segment $f_{1j}$ contains the value, encoded on three bits, of the identifier IdV of the function $V_k$. Each sub-segment $p_{1j}$ contains the value of the parameter $p_{1j}$.

The builder 28, on the basis of the value contained in the sub-segments $f_{1j}$ and using the table 60, retrieves the address encoded on two bytes corresponding to the value of this identifier. Thus, from the value of the identifier $f_{1j}$ and the parameter $p_{1j}$, the builder 28 generates the two new numerical constants defining the new function $f_{1j}$.

What has just been described in the particular case of the segment $F_1$ can also be applied to the other segments $F_i$.

Then, during an operation 110, the new numerical constants generated during the operation 108 are recorded in the indirection table Tab' independent of the table 62 but structurally identical.

After the step 106, during a step 112, the check 24 verifies the robustness of the enciphering algorithm F' obtained. For example, it ascertains that the algorithm F' is robust relative to the methods of cryptanalysis using the frequency of appearance of certain patterns of bits in the cryptogram. To this end, the checker 24 uses the algorithm F' to encipher a predetermined piece of data by means of a predetermined key K to obtain a cryptogram D*. Then, it verifies the random distribution of the bits at zero and at one in the cryptogram D*. To this end, the different methods of verification described in the following document are used:

*Federal Information Processing Standard Publication (FIPS)* 140-1, 11 Jan. 1994, US Department of Commerce/National Institute of Standard and Technology.

More specifically, the testing or checking methods applied here are the same as those described in paragraph 4.11.1 of this document to test the random distribution of bits in a sequence of bits generated by a pseudo-random generator (see the section entitled "Statistical Random Number Generator Tests" on page 43 of this document).

At the step 112, a test of identity is also made, i.e. it is ascertained that the cryptogram D* is not identical to the piece of data D.

To perform these tests, the chosen key K can be the one currently used to carry out the enciphering of the control word CW.

If one of the tests applied during the test 112 is not satisfactory, the method returns to the step 102. If not, it is deemed to be the case that the seed used makes it possible to build a robust enciphering algorithm. In this case, the new indirection table Tab' as well as the seed are memorized in the sender at a step 114. At the step 114, the seed thus generated is also transmitted to the processor 36 by means of the network 6 on the concealed channel. However, the indirection table Tab' is not used so long as a trigger element does not come into play.

Then, when the activating element comes into play, a step 116 is carried out in which the indirection table 62 is replaced by the indirection table Tab'. After the step 116, the method returns to the phase 70. Thus, during new executions of this phase 70 the algorithm F' of renewed assignment which is used instead of the former encipherment algorithm F.

Here, the triggering element is the sending of an ECM message containing a particular code capable of triggering the renewal of the encipherment algorithm in the processor 36.

At the same time, in the phase 100, during a phase 120, the processor 36 executes a renewal of the decipherment algorithm $F^{-1}$. Initially at a step 122, the processor 36 receives the seed sent at the step 114 by the sender 4. Then, at a step 124, this seed is memorized. This seed is not used so long as the triggering element does not come into play.

At a step 126, the processor 36 acquires this triggering element. For example, the processor 36 receives a message ECM containing the instruction that triggers a renewal of the deciphering algorithm.

Then, at a step 128, in response to the acquisition of the triggering element, the generator 54 carries out the deterministic expansion of the seed received. The step 128 is identical to the step 104 so that the sequence of numbers obtained is the same.

Then, at a step 130, the code of a renewed deciphering algorithm $F'^{-1}$ corresponding to the algorithm F' is built from this sequence of numbers. At an operation 132, the new numerical constants to be recorded in the table 64 are generated. Here, this operation 132 is identical to the operation 108.

Then, during an operation 134, each of the numerical constants contained in the indirection table 64 is replaced by the corresponding new numerical constant generated during the step 132. Thus, at the end of the step 130, the code of the algorithm $F^{-1}$ has been replaced by the code of the algorithm $F'^{-1}$.

Then, the operation returns to the phase 70. Thus, during new executions of the phase 70, it is the renewed deciphering algorithm $F'^{-1}$ that is used instead of the former algorithm $F^{-1}$, to decipher the cryptograms CW*.

Figure 9:
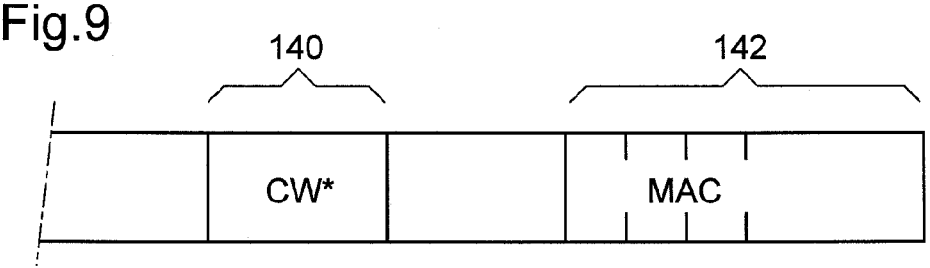
FIG. 9 is a schematic and partial illustration of an information frame corresponding to an ECM (Entitlement Control Message)

An example of transmission of the seed from the sender 4 to the receiver 8 shall now be described. To this end, we may briefly recall, with reference to FIG. 9, the structure of an ECM message. An ECM message contains a field 140 containing a cryptogram CW* and a field 142 containing a signature or cryptographic redundancy called MAC. For example, the signature 142 is encoded on 126 bits. This signature 142 verifies the integrity of the message. It is built by applying a predetermined signature function to the other pieces of data of the message. For example, the signature MAC is built by applying a hash function to the bits of the other pieces of data contained in the same ECM message and especially in taking account of the bits of the cryptogram CW*.

Figure 10:
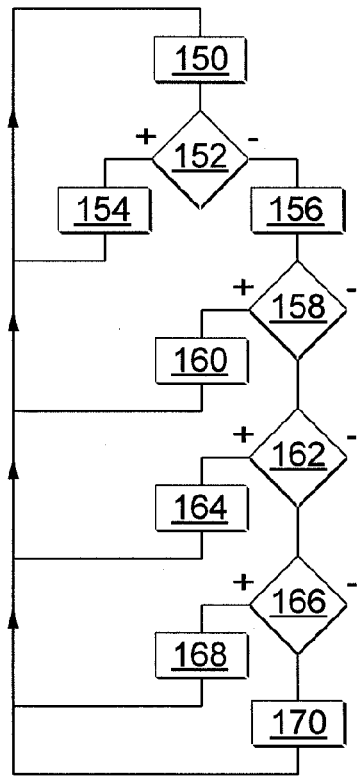
FIG. 10 is a flowchart of a method for transmitting data by a concealed channel between the sender and the receiver of the system of FIG. 1.

In this context, the reception of the seed and of the trigger element by the processor 36 through a concealed channel shall now be described with reference to FIG. 10 in the particular case where the seed is encoded on 128 bits.

Initially, the processor 36, during a step 150, computes the signature MACc of the ECM message received. To this end, the same signature function as that used by the sender 4 can be applied to the data of the ECM.

Then, at a step 152, the signature MACc built is compared with this signature MACe contained in the field 142 of the ECM.

If these signatures are identical, then the invention carries out a step 152 for the processing of the ECM by the processor 36. The processing furthermore consists in deciphering the cryptogram CW* if the titles of access contained in the memory 58 correspond to the conditions of access contained in the received ECM.

If not, at a step 156, the signatures MACc and MACe are combined byte by byte by means of an XOR operation. The sixteen bytes corresponding to the results of this combination are recorded respectively in the boxes RES[0] to RES[15] of a residue.

Then, at a step 158, a check is made to see if the bytes recorded in the even-parity indexed boxes of the residue are equal to a first predetermined value. For example, the following comparisons are made for i ranging from 0 to 7:

$$RES[2\,i]=0xA5$$

where 0xA5 is a predetermined value expressed in hexadecimal notation.

Should all the compared values be equal, the invention carries out a step 160 during which the values contained in the boxes RES[2 i+1] having odd-parity index values are recorded respectively in the boxes SEED[i], for i ranging from 0 to 7. Then, at a step 160, the received ECM is processed normally in the processor 36.

Should the boxes compared at the step 158 not correspond to the first predetermined value, then the operation goes to a step 162 for comparing the boxes RES[2xi] with a predetermined value, for example 0x5A for i ranging from 0 to 7. If all the compared boxes are equal to the value 0x5A, then the invention proceeds to a step 164 during which the values contained in the boxes RES[2xi+1] for i ranging from 0 to 7 are stored in the boxes SEED[8+i] respectively. At the step 64, the message ECM received is also dealt with normally by the processor 36.

Should the boxes compared at the step 162 be not equal to the second predetermined value, then the operation proceeds to a step 166 for comparing boxes with a third predetermined value, for example 0x00, for i ranging from 0 to 7. If all the boxes compared at the step 166 correspond to the third predetermined value then, at a step 168, an ECM is processed. Furthermore, the fact of proceeding to the step 168 corresponds to the acquisition of the triggering element. In other words, the step 168 corresponds to the step 126 of the method according to the invention. Thus, the step 168 authorizes the continuance of the renewal of the cryptographic algorithm in the processor 36 as described with reference to the phase of 120 of FIG. 7.

If not, it means that the message ECM received is erroneous and, at a step 170, the processor 36 reports it and the message ECM is not processed.

The method for sending the seed or the triggering element on a concealed channel is deduced from the reception method described with reference to FIG. 10. This method shall therefore not be described in greater detail here below.

Many other embodiments are possible. For example, the processor 36 may be integrated irreversibly to the de-scrambler 40 or the decoder 34. The processor 36 can also be a software module modified in order to be more resistant to attempts at cryptanalysis than other parts of the software of the decoder 44.

The network 6 may be a wire network. The network 6 may also be a packet-switching network such as the Internet In the particular case described here, the memory 16 and 58 contain the executable code of the functions $V_k$. This code is directly executable by the modules 10 and 50. As a variant, these executable codes are replaced by interpretable codes of the functions $V_k$. In this case, the modules 10 and 50 have interpreters, respectively 180 and 182 (see FIG. 1) capable of interpreting these codes. Thus, in this variant, the cryptographic modules comprise interpreters capable of interpreting the code of the renewed algorithm built by the controller.

In another embodiment, the executable code of the functions $V_k$ is replaced by the source code of these same functions. In this case, the builders 28 and 16 respectively contain compliers 184 and 186 (see FIG. 1). Furthermore, during the step for building the renewed algorithm, these compliers 184 and 186 are used to compile the source code corresponding to the functions $V_k$ used to define the functions $f_{ij}$. Thus, the builders 28 and 26 each generate a new code executable by the modules 10 and 50 corresponding to the renewed algorithms.

Most of the cryptographic algorithms comprise numerous operands independent of the piece of data D to be enciphered or deciphered and the key used for this purpose. For example, the algorithms AES and DES comprise permutation tables and substitution tables or S-boxes. Other cryptographic algorithms use indexing or shift tables. These tables take the form of matrices containing predetermined numerical values. These numerical values are operands of switching, substitution, indexing and shifting operations. Other operands used as blanking masks or as coefficients or constants in a mathematical computation formula are also found in these cryptographic algorithms. To renew such an algorithm provided with operands, it is possible to replace a part or the totality of these operands by new operands. To this end, the operation proceeds as described to replace parameters $p_{ij}$ with reference to FIG. 7.

To renew a cryptographic algorithm, it is also possible to replace the mathematical operators of this algorithm which are independent of the piece of data to be enciphered or deciphered and of the key to be used. In low-level language, these mathematical operators each correspond to a mnemonic corresponding to an instruction directly executable or interpretable by an electronic computer. The XOR, NOT, +, −, ×, rot_left, rot_right, mod operators of the functions $V_k$ are for example operators corresponding to mnemonics of instructions of the sets of instructions executable by the computer of the sender or receiver. Other mathematical operators exist such as for example the AND and OR operators. A method for this has already described in the particular case of the cryptographic algorithm used in the system of FIG. 1. Indeed, at each cryptographic algorithm renewal, the operators of the functions $f_{ij}$ are replaced by other operators.

To renew the code of the cryptographic algorithm, it is again possible to replace instructions of the code other than the mathematical operators. For example JUMP, CALL or NOP (No OPeration) instructions may be replaced. To illustrate this, we take the following example of the following code written in assembler language.

```
0x00 JUMP 0x10
[Code of the function V₀]
0x10 JUMP 0x20
[Code of the function V₁]
0x20 JUMP 0x30
[Code of the function V₂]
0x30 JUMP 0x40
...
```

Depending on the value of the seed received, certain JUMP instructions may be replaced by NOP instructions. For example, if the JUMP instruction at line 0x10 is replaced by the NOP instruction, the computer is compelled to execute the code corresponding to the function $V_1$. The code of the cryptographic algorithm is therefore renewed without modification of the mathematical operands and the operators. When these instructions are replaced by other instructions, the code execution flow is routinely modified whereas when only the mathematical operators and the operands are replaced, this is not routinely the case.

To build the renewed cryptographic algorithm, it is possible to replace operands or replace mathematical operators or replace instructions other than the operands and mathematical operators or again any combination of these replacements Preferably, only a part of the numerical constants of the code of the cryptographic algorithm is replaced. However, the number of constants replaced to obtain a renewed cryptographic algorithm must be great, i.e. preferably greater than 2, 10 or 50. The greater the number of numerical constants replaced, the more difficult it is to discover the renewed cryptographic algorithm on the basis of information on the former cryptographic algorithm.

As a variant, a secret code is sent in a message to the processor for example on the hidden channel. This secret code informs the processor that the data on the seed are contained in a predetermined subsequent message. Thus, the secret code and the data on the seed do not need to be in the same message.

What has been described here above in the case of the renewal of the deciphering algorithm code used by the processor 36 can also be applied to the renewal of a decipherment algorithm G used by the processor 36. In this case, at the phase 100, the algorithm corresponding to the algorithm G built by the builder 28 is the algorithm G itself.

What has been described in the particular case of renewal of algorithms for enciphering and deciphering a control word can be applied to cryptographic algorithms used to sign and verify the signature of messages such as ECM and EMM messages.

What has just been described in the case of renewal of a symmetrical cryptographic algorithm may also be adapted to an asymmetrical cryptographic algorithm.

The invention claimed is:

1. A method for renewing code, executable or interpretable by an electronic computer, for a cryptographic algorithm capable of enciphering a piece of data (D) by means of a key (K) to obtain a cryptogram (D*) or decipher a cryptogram (D*) by means of a key (K) to obtain a piece of unencrypted data (D), said code including at least N numerical constants, each numerical constant corresponding to an operand or to a mnemonic of an instruction of the code, a value of said numerical constants being independent of the piece of data (D), the key (K) and the cryptogram (D*), said method comprising: receiving a randomly drawn seed, the size of which, in terms of number of bits, is at least four times smaller than the number of bits needed to encode the N numerical constants of the cryptographic algorithm, expanding the seed deterministically to obtain a sequence of numbers, the sizes of which, in number of bits, are at least equal to the number of bits needed to encode the N numerical constants of the cryptographic algorithm, generating N new numerical constants from the sequence of numbers obtained, and replacing the N numerical constants of the code of the cryptographic algorithm by the N new numerical constants generated to obtain a code of a renewed cryptographic algorithm.

2. The method of claim 1, wherein each numerical constant corresponds either to an operand or to a mathematical operator that, when replaced by a new mathematical operator, retains an order of execution of the instructions of the code of the cryptographic algorithm.

3. The method of claim 1, further comprising: if the presence of a secret code within a first part of a received message is detected, then using the pieces of data contained in a second part of the message or a subsequently received message to build the seed, and if the presence of the secret code within the first part of the message is not detected, then using the pieces of data contained in the first and second parts for ends other than the renewal of the cryptographic algorithm.

4. The method of claim 3, further comprising, if the presence of the secret code is not detected, then using the pieces of data contained in the first and second parts to verify integrity of the data contained in the message.

5. The method of claim 3, wherein the message is one of an entitlement control message or an entitlement management message.

6. The method of claim 1, wherein replacing the N numerical constants of the code of the cryptographic algorithm by the N new numerical constants generated is triggered in response to a triggering event independent of the reception of the seed.

7. The method of claim 1, wherein the size of the seed in numbers of bits is at least ten times smaller than the number of bits needed to encode the N numerical constants.

8. The method of claim 1, wherein expanding the seed deterministically comprises initializing a pseudo-random generator with the seed.

9. The method of claim 1, wherein N is greater than two.

10. An apparatus comprising an electronic computer configured to execute or interpret a module for renewing code for a cryptographic algorithm capable of enciphering a piece of data (D) by means of a key (K) to obtain a cryptogram (D*) or decipher a cryptogram (D*) by means of a key (K) to obtain a piece of unencrypted data (D), said code including at least N numerical constants, each numerical constant corresponding to an operand or to a mnemonic of an instruction of the code, a value of said numerical constants being independent of the piece of data (D), the key (K) and the cryptogram (D*), wherein said module to be executed by said electronic computer includes a sub-module for receiving a randomly drawn seed, the size of which, in terms of a number of bits, is at least four times smaller than the number of bits needed to encode the N numerical constants of the cryptographic algorithm, a deterministic generator of numbers, the generator being configured to be initialized with the seed to obtain a sequence of numbers, the size of each number, in number of bits, being at least equal to the number of bits needed to encode the N numerical constants of the cryptographic algorithm, and a builder of cryptographic algorithmic codes, said builder being capable of: generating N new numerical constants from the sequence of numbers obtained, and replacing the N numerical constants of the code of the cryptographic algorithm by the N new numerical constants thus generated to obtain a code of a renewed cryptographic algorithm.

11. An apparatus comprising an electronic computer configured to implement a security processor capable of executing or interpreting the code of a cryptographic algorithm to encipher a piece of data (D) by means of a key (K) to obtain a cryptogram (D*) or decipher a cryptogram (D*) by means of a key (K) to obtain a piece of unencrypted data (D), this code comprising at least N numerical constants, each numerical constant corresponding to an operand or to a mnemonic of an instruction of the code, a value of these numerical constants being independent of the piece of data (D), the key (K) and the cryptogram (D*), said security module comprising a module for renewing the code of cryptographic algorithm recited in claim 10.

12. A method for generating a seed intended for use in a method for renewing the code of a cryptographic algorithm according as recited in claim 1, said method comprising: a) randomly drawing a seed whose size, in terms of number of bits, is at least four times smaller than the number of bits needed to encode the N numerical constants of the code of the cryptographic algorithm to be renewed, b) using the seed drawn in step (a), creating a renewed enciphering or deciphering algorithm code by means of the method of renewal as recited in claim 1, c) checking the robustness of the code of the renewed algorithm relative to at least one method of cryptanalysis, d) if the code of the encipherment algorithm is not robust relative to the method of cryptanalysis, then returning to the step a) and, if not, e) transmitting the randomly drawn seed to a receiver capable of implementing the method of renewal of the code of the cryptographic algorithm.

13. An apparatus comprising an electronic computer configured to execute or interpret a module for generating a seed intended for use in order to renew the code of a cryptographic algorithm by means of a method according to claim 1, said module comprising: a generator capable of randomly drawing a seed whose size, in terms of number of bits, is at least four times smaller than the number of bits needed to encode the N numerical constants of the cryptographic algorithm to be renewed, and a sub-module for creating a renewed encipherment and decipherment algorithm code by means of the method of renewal according to claim 1, when the received seed is the one drawn by the generator; a checker for checking the robustness of the code of the renewed algorithm relative to at least one method of cryptanalysis, said checker being capable of: inhibiting the transmission of the randomly drawn seed to a receiver if the renewed algorithm is not robust with respect to the method of cryptanalysis and, if not, permitting the transmission of the randomly drawn seed to a receiver capable of implementing the method of renewal of the code of the cryptographic algorithm.

14. A manufacture comprising instructions encoded thereon, wherein said instructions, when executed by an electronic computer, cause the electronic computer to execute a method according to claim 1.

15. A manufacture comprising a non-transitory computer-readable medium having encoded thereon instructions that, when executed by an electronic computer, cause the electronic computer to execute a method according to claim 12.

16. The method of claim 9, wherein N is greater than ten.

* * * * *